(12) United States Patent
Rawsky et al.

(10) Patent No.: US 11,066,064 B2
(45) Date of Patent: Jul. 20, 2021

(54) SYSTEMS AND METHODS FOR OPERATING A HYBRID VEHICLE WITH A MANUAL SHIFT TRANSMISSION

(71) Applicant: Ford Global Technologies, LLC, Dearborn, MI (US)

(72) Inventors: Christopher Rawsky, Van Buren Township, MI (US); Bernard Nefcy, Novi, MI (US); Daniel Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 16/189,505

(22) Filed: Nov. 13, 2018

(65) Prior Publication Data
US 2020/0148191 A1    May 14, 2020

(51) Int. Cl.
*B60W 20/30* (2016.01)
*B60W 10/06* (2006.01)
*B60W 10/08* (2006.01)
*B60W 30/19* (2012.01)

(52) U.S. Cl.
CPC ............ *B60W 20/30* (2013.01); *B60W 10/06* (2013.01); *B60W 10/08* (2013.01); *B60W 30/19* (2013.01); *B60W 2510/0208* (2013.01); *B60W 2510/0638* (2013.01); *B60W 2510/081* (2013.01); *B60W 2710/0644* (2013.01); *B60W 2710/081* (2013.01)

(58) Field of Classification Search
None
See application file for complete search history.

(56) References Cited

U.S. PATENT DOCUMENTS

| | | | |
|---|---|---|---|
| 8,608,617 B2 | 12/2013 | Stervik | |
| 9,592,820 B2* | 3/2017 | Park | B60L 50/16 |
| 9,855,954 B2* | 1/2018 | Bang | B60W 30/19 |
| 2007/0107961 A1* | 5/2007 | Iwanaka | B60K 6/365 |
| | | | 180/65.6 |
| 2013/0304288 A1 | 11/2013 | Yuda | |
| 2014/0297073 A1* | 10/2014 | Jeong | B60W 20/40 |
| | | | 701/22 |

FOREIGN PATENT DOCUMENTS

WO    2006089669 A1    8/2006

* cited by examiner

*Primary Examiner* — Colby M Hansen
(74) *Attorney, Agent, or Firm* — David Kelley; McCoy Russell LLP (57) ABSTRACT

Systems and methods for operating a vehicle that includes a manual transmission are presented. In one example, a speed rate of change of a driveline torque source is adjusted during a shifting of gears of the manual transmission responsive to a gear that is being disengaged and a gear that is being engaged during the shifting of gears. The torque source may be an electric machine and/or an internal combustion engine.

8 Claims, 6 Drawing Sheets

SYSTEMS AND METHODS FOR OPERATING A HYBRID VEHICLE WITH A MANUAL SHIFT TRANSMISSION

FIELD

The present description relates to systems and methods for operating a vehicle with a transmission that may be selectively coupled to a torque source. The methods and system may be particularly useful for improving manual shifting.

BACKGROUND AND SUMMARY

Manually operated transmissions allow a human driver of a vehicle to selectively engage and disengage a torque source to a transmission so that the transmission may be shifted between gears. However, to smoothly change from a first transmission gear to a second transmission gear, the human driver may have to perform more operations than simply applying the clutch pedal. For example, during downshifting from a higher gear to a lower gear, the driver may also need to increase engine speed during the time that the clutch is opened so that engine speed matches transmission input shaft speed. Matching the engine speed to the transmission input shaft speed allows the possibility of driveline torque disturbances to be reduced when the clutch pedal is released. However, if the driver is also applying the vehicle's brakes and the clutch while the downshift is being performed, the driver may need to contemporaneously adjust the brake pedal and the accelerator pedal. It may be difficult for some drivers to contemporaneously apply a brake pedal and an accelerator pedal with a single foot. Consequently, downshifting may lead to a driveline torque disturbance and unexpected vehicle braking when the clutch is fully released. Therefore, it may be desirable to provide a way of assisting a human driver to perform shifting of a manual transmission so that a speed differential across a manual clutch during shifting may be reduced without having to have the human driver control engine speed.

The inventors herein have recognized the above-mentioned disadvantages and have developed a vehicle operating method, comprising: adjusting a speed of at least one torque source via a controller responsive to desired rate of speed change that is function of an engaged gear before a manual gear shift and a gear engaged after the manual gear shift while a manually operated clutch is open.

By adjusting a speed of at least one torque source responsive to a desired rate of speed change that is a function of an engaged gear before a manual gear shift and a gear engaged after the manual gear shift, it may be possible to provide the technical result of improving shifting of a manual transmission by an inexperienced driver. Specifically, speed of at least one torque source may be increased or decreased at a rate that is a function of the gear being disengaged (e.g., old gear) and the gear that is being engaged (e.g., new gear) so that a speed difference across the manually operated clutch may be reduced and so that the shift may be performed in a timely manner. Since the torque source and the transmission input shaft are rotating at similar speeds, the manually operated clutch may be closed without generating a large driveline torque disturbance. In one example, the speed of the at least one torque source may be adjusted via adjusting a speed of an electric machine. In addition, when the transmission is upshifted or downshifted between lower gears (e.g., first gear and second gear), the desired rate of speed change may be higher since the transmission input shaft speed change may be higher.

Conversely, the desired rate of speed change may be lower for shifting the transmission between higher gears (e.g., fifth gear and sixth gear) since the transmission input shaft speed change may be lower.

The present description may provide several advantages. In particular, the approach may reduce driveline torque disturbances and clutch wear. Further, the approach may improve a driver's confidence level when shifting a manual transmission. Additionally, the approach may increase driveline efficiency during manual transmission gear shifting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
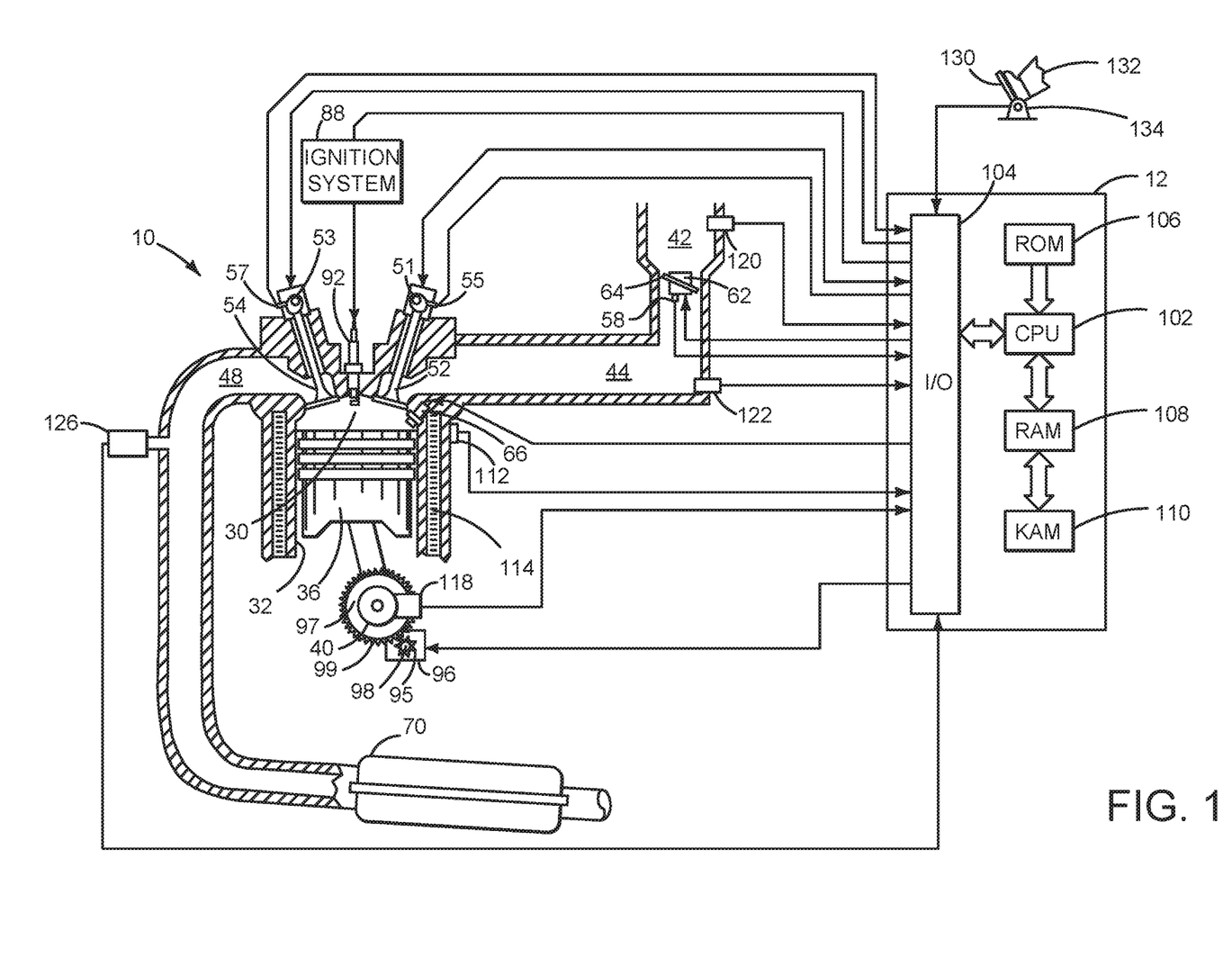
FIG. 1 is a schematic diagram of an engine.
Figure 2:
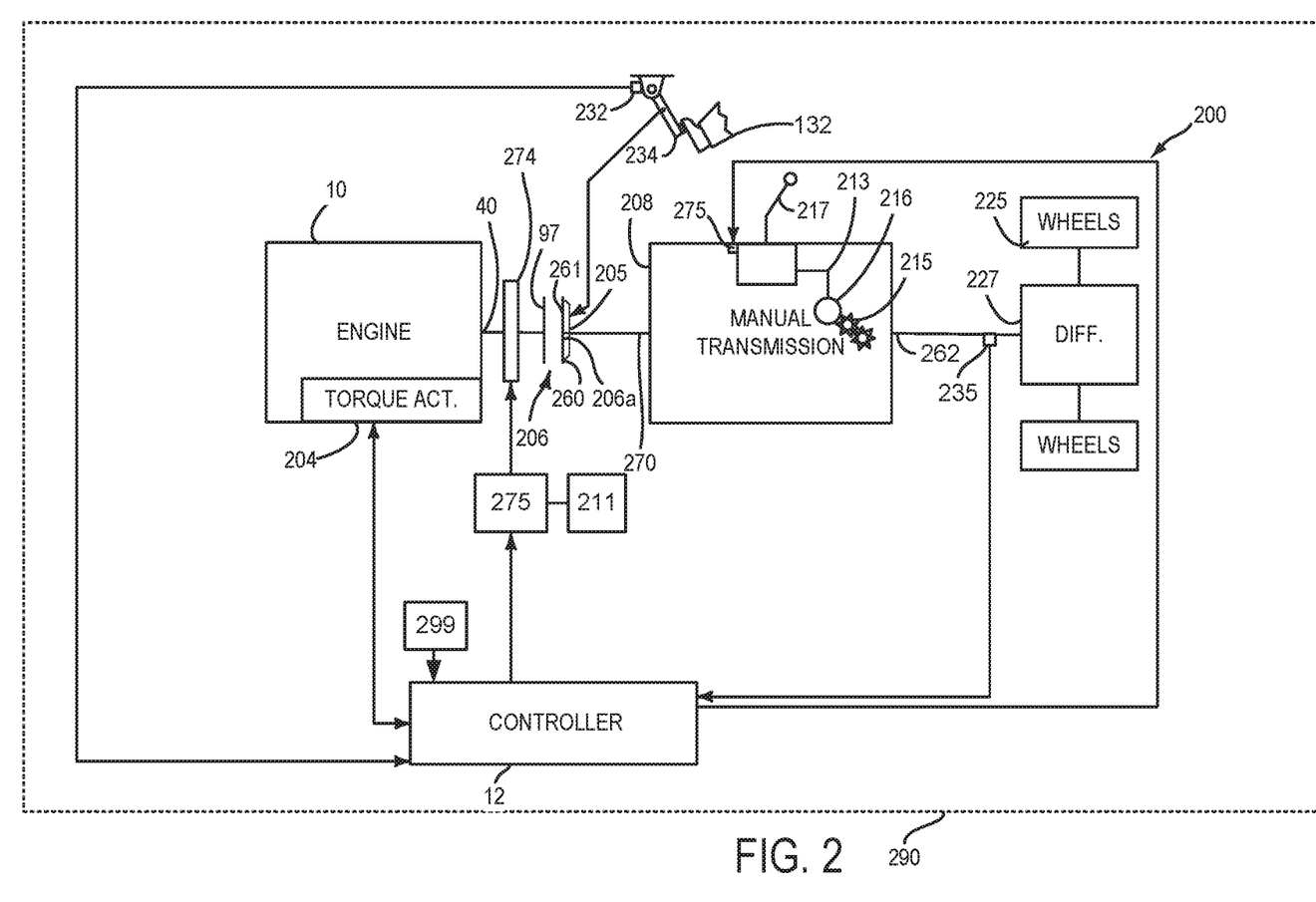
FIG. 2 is a schematic of an example vehicle driveline configuration.

The present description is related to operating a vehicle that includes an internal combustion engine, an electric machine, and a manual transmission. A controller may assist a human driver to smoothly shift the manual transmission so that driveline torque disturbances may be reduced and so that the human driver may concentrate on the vehicle's path of travel. The vehicle may include an engine as shown in FIG. 1. The engine may be mechanically coupled to driveline configuration as shown in FIG. 2. The vehicle may operate according to sequence shown in FIG. 3. The vehicle may include and operate according to the method of FIGS. 4 and 5. A controller block diagram for the vehicle of FIG. 2 is shown in FIG. 6.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3 and employs the various actuators of FIGS. 1-3 to adjust engine and driveline operation based on the received signals and instructions stored on memory of controller 12. Engine 10 and electric machines described herein that provide torque to the vehicle driveline may be referred to as driveline torque sources.

Engine 10 includes combustion chamber 30 and cylinder walls 32 with piston 36 positioned therein and connected to crankshaft 40. Flywheel 97 and ring gear 99 are coupled to crankshaft 40. Alternatively, crankshaft 30 may be coupled to an electric machine and the electric machine may be coupled to the flywheel 97 so that the engine, electric machine, and flywheel rotate together. Crankshaft 40 rotates and selectively provides power to vehicle wheels via a driveline. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Fuel injector 66 deliver liquid fuel in proportion to pulse widths provided from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A human driver 132 inputs a driver demand torque to controller 12 via accelerator pedal 130 and accelerator pedal position sensor 134. The driver demand torque may be a function of vehicle speed and accelerator pedal position.

Controller 12 is shown in FIG. 1 as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 and/or electric machine 274 in vehicle 290. Engine 10 may be started with an engine starting system shown in FIG. 1. Further, engine 10 may generate torque that may be adjusted via torque actuator 204, such as a fuel injector, cam, throttle, etc. Electric machine 274 may be directly coupled to crankshaft 40 of engine 10. Electric machine 274 may generate positive torque to propel vehicle 290. Alternatively, electric machine 274 may generate negative torque by resisting rotation of driveline 200 and generating electrical energy, which may be stored in a battery or other electric energy storage device (e.g., capacitor) 211. Inverter 275 may convert direct current (DC) electrical power from electric energy storage device 211 into alternating current (AC) power to operate electric machine 274. Further, inverter 275 may convert AC electrical power from electric machine 274 into DC electrical power that is stored in electric energy storage device 211.

An engine output torque and an electric machine output torque may be transmitted from flywheel 97 to manually operated clutch 206. Crankshaft 40 is directly coupled to electric machine 274 and electric machine 274 is directly coupled to flywheel 97. Manually operated clutch 206 selectively engages flywheel 97 to transmit engine torque and/or electric machine torque to transmission input shaft 270. An input side 261 of manually operated clutch 206 may engage flywheel 97 to transfer engine and/or electric machine torque to transmission input shaft 270. The manually operated clutch 206 is directly coupled to input shaft 270 of transmission 208 via splines (not shown). An actuator 205 moves manually operated clutch plate 206a in a longitudinal direction to engage or disengage transmission input shaft 270 to the flywheel 97. Clutch actuator 205 may be comprised of a combination of mechanical, electrical, and hydraulic components. In one mode, a position of actuator 205 is adjusted to move proportionately with a positon of clutch pedal 234 so that clutch 206 may be applied and released. A position of clutch pedal 234 is relayed to controller via sensor 232. Clutch pedal 234 is in a base position when human driver 132 is not touching clutch pedal 234. Driver 132 applies force to move clutch pedal from its base position so that manually operated clutch 206 may be opened when clutch pedal 234 is applied. Manually operated clutch 206 may be closed when clutch pedal 234 is released.

Input shaft 270 of manually operated transmission 208 may be selectively coupled to gears (e.g., gears 1-6) 215. The gears 215 are fixed ratio gears that provide different ratios between transmission input shaft 270 and output shaft 262. Gears 215 may freely rotate about the output shaft 262 and synchronizers 216 may be utilized to lock the gears to the output shaft 262. Synchronizers 216 allow input shaft 270 to rotate with output shaft 262 when manual clutch 260 is disengaged so that a new gear may be engaged. Gears 215 may be manually engaged and disengaged by opening clutch 206 and a human driver 132 moving manual gear selector 217 to individually engage gears 215 via shift forks 213 and synchronizers 216. Thus, gears of manual transmission 208 are not automatically changed or changed via non-human actuators such as solenoids. Closing clutch 206 transfers power from engine 10 and electric machine 274 to wheels 225 when one of gears 215 is engaged via manual gear selector or shifter 217. Gear positions are reported to controller 12 via gear position sensors 275. Output shaft 262 links manual transmission 208 to wheels 225. The rotational speed of output shaft 262 may be determined via output shaft speed sensor 235. In some examples, an axle and differential 227 with gears may be positioned between manual transmission 208 and wheels 225.

Controller 12 may also receive input from a driver and provide status and data to a driver via a machine/human interface 299. The machine/human interface 299 may be a keyboard or touch screen device and a speaker for audible notification of a driver.

Thus, the system of FIGS. 1 and 2 provides for a vehicle system, comprising: an engine coupled to an electric machine; a manual transmission coupled to the electric machine, the manual transmission including a clutch that moves responsive to a clutch pedal; and a controller including executable instructions stored in non-transitory memory to adjust a speed of the engine and the electric machine as a function of a desired rate of speed change from a speed of the electric machine at a time that the clutch is fully opened to an anticipated input speed of the manual transmission at a time when the clutch is fully closed. The vehicle system includes where the anticipated input speed of the manual transmission is a function of a newly engaged gear and transmission output shaft speed at the time when the clutch is opened. The vehicle system further comprises additional instructions to adjust the speed of the engine and the electric machine as a further function of a maximum torque of the electric machine at a speed of the electric machine at the time the clutch is opened. The vehicle system further comprises additional instructions to adjust the speed of the engine and the electric machine as a further function of a maximum torque of the engine at a speed of the engine at the time the clutch is opened. The vehicle system further comprises additional instructions to adjust the speed of the engine and the electric machine as a further function of an operating mode of a vehicle. The vehicle system includes where the operating mode is a sport mode or a touring mode, and where the desired rate of speed change while the vehicle is operating in the sport mode during a gear change is greater than the desired rate of speed change while the vehicle is operating in the touring mode during the gear change.

Figure 3:
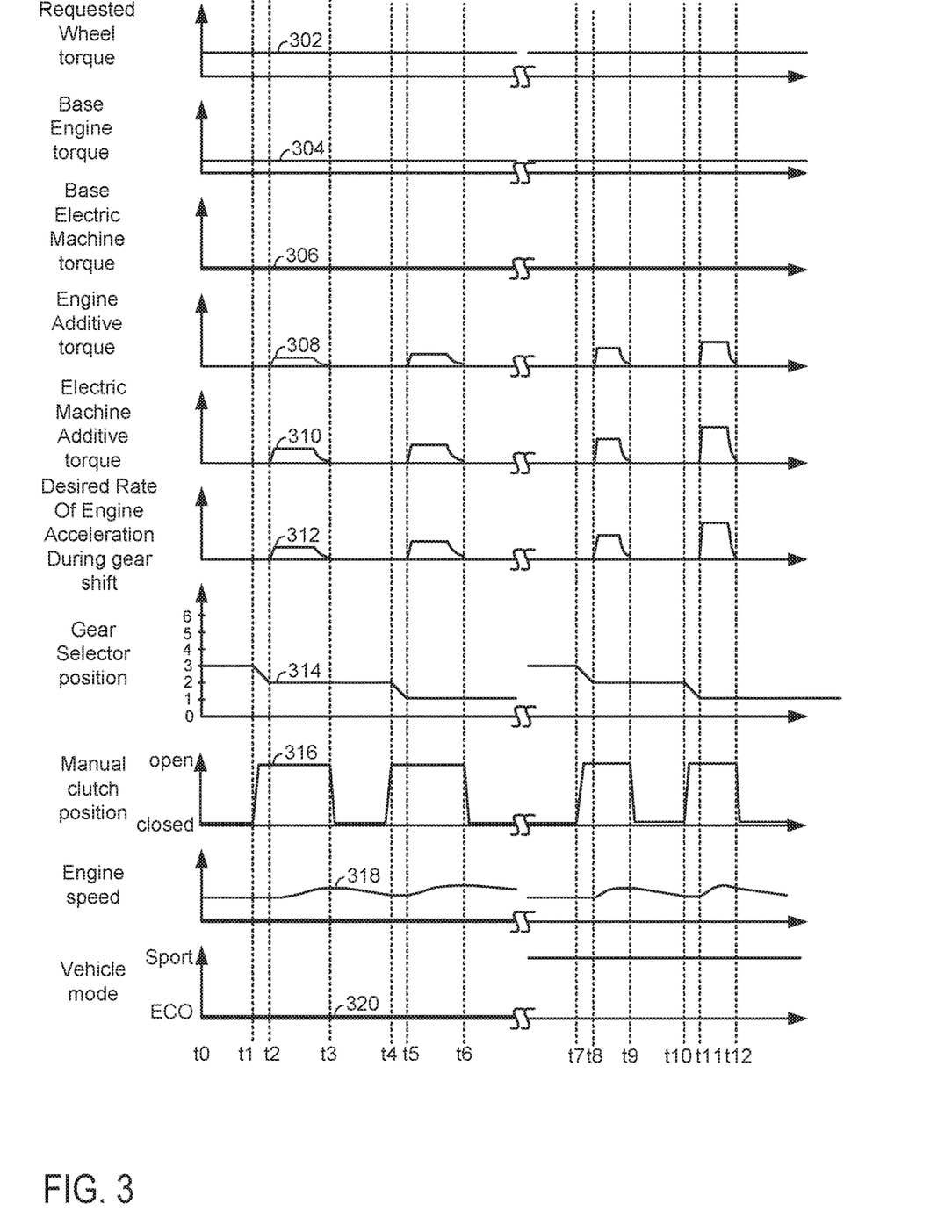
FIG. 3 shows example shifting sequence for a manual transmission.

Referring now to FIG. 3, an example prophetic manual gear shifting sequence is shown. The method of FIGS. 4 and 5 and the system of FIGS. 1 and 2 may provide the sequence of FIG. 3. The plots of FIG. 3 occur at the same time and the plots are aligned in time. The vertical lines at t0-t12 represent times of interest during the sequence. The SS marks along each horizontal axis of each plot represent breaks in time and the break in time may be long or short in duration.

The first plot from the top of FIG. 3 is a plot of requested wheel torque versus time. The vertical axis represents requested wheel torque and the amount of wheel torque increases in the direction of the vertical axis arrow. The horizontal axis represents time and time increases from the left side of the plot to the right side of the plot. Trace 302 represents requested wheel torque. The requested wheel torque may be determined from accelerator pedal position and vehicle speed. In one example, accelerator pedal position and vehicle speed index or reference a function of empirically determined values of wheel torque and the function outputs a requested wheel torque. Values in the table may be determined via applying the accelerator pedal and monitoring wheel torque on a chassis roll dynamometer.

The second plot from the top of FIG. 3 is a plot of base engine torque versus time. The vertical axis represents base engine torque and the amount of base engine torque increases in the direction of the vertical axis arrow. The horizontal axis represents time and time increases from the left side of the plot to the right side of the plot. Trace 304 represents base engine torque. Base engine torque is an amount of torque provided by the engine to the driveline and that is based on the requested wheel torque. The base engine torque plus the base electric machine torque may provide the requested wheel torque. In one example, the requested wheel torque is divided into a first torque that is provided via the engine (e.g., the base engine torque) and a second torque that is provided by the electric machine (e.g., the base electric machine torque). The base engine torque plus the base electric machine torque multiplied by the transmission gear ratio and multiplied by the axle gear ratio may equal the requested wheel torque. The first torque may be a function of the requested wheel torque, battery state of charge, and other vehicle operating conditions.

The third plot from the top of FIG. 3 is a plot of base electric machine torque versus time. The vertical axis represents base electric machine torque and the base electric machine torque increases in the direction of the vertical axis arrow. The horizontal axis represents time and time increases from the left side of the plot to the right side of the plot. Trace 306 represents base electric machine torque. Base electric machine torque is an amount of torque provided by the electric machine to the driveline and that is based on the requested wheel torque. In one example, the requested wheel torque is divided into a first torque that is provided via the engine (e.g., the base engine torque) and a second torque that is provided by the electric machine (e.g., the base electric machine torque). The second torque may be a function of the requested wheel torque, battery state of charge, electric machine temperature, battery temperature, and other vehicle operating conditions.

The fourth plot from the top of FIG. 3 is a plot of engine additive torque, or alternatively referred to as additive engine torque, versus time. The vertical axis represents engine additive torque and the amount of engine additive torque increases in the direction of the vertical axis arrow. The horizontal axis represents time and time increases from the left side of the plot to the right side of the plot. Trace 308 represents additive engine torque. The engine additive torque may be a torque adjustment to the base engine torque to improve manual transmission shifting. The engine additive torque may increase or decrease the base engine torque so that engine speed and electric machine speed may approach an anticipated or expected transmission input shaft speed during a manual transmission gear shift.

The fifth plot from the top of FIG. 3 is a plot of electric machine additive torque, or alternatively referred to as additive electric machine torque, versus time. The vertical axis represents electric machine additive torque and the amount of electric machine additive torque increases in the direction of the vertical axis arrow. The horizontal axis represents time and time increases from the left side of the plot to the right side of the plot. Trace 310 represents additive electric machine torque. The electric machine additive torque may be a torque adjustment to the base electric machine torque to improve manual transmission shifting. The electric machine additive torque may increase or decrease the base electric machine torque so that engine speed and electric machine speed may approach an anticipated or expected transmission input shaft speed during a manual transmission gear shift.

The sixth plot from the top of FIG. 3 is a plot of a desired rate of engine and electric machine acceleration during a transmission gear shift versus time. The vertical axis represents the desired rate of engine and electric machine acceleration during a transmission gear shift and the desired rate of engine and electric machine acceleration during a transmission gear shift increases in the direction of the vertical axis arrow. The horizontal axis represents time and time increases from the left side of the plot to the right side of the plot. Trace 312 represents the desired rate of engine and electric machine acceleration during a transmission gear shift.

The seventh plot from the top of FIG. 3 is a plot of transmission gear selector position versus time. The vertical axis transmission gear selector position and the transmission gears are indicated along the vertical axis. The horizontal axis represents time and time increases from the left side of the plot to the right side of the plot. Trace 314 represents transmission gear selector position.

The eighth plot from the top of FIG. 3 is a plot of manual clutch position versus time. The vertical axis represents manual clutch position and the manual clutch is fully closed when trace 316 is near the horizontal axis. The manual clutch is fully open when trace 316 is near the level of the vertical axis arrow. The horizontal axis represents time and time increases from the left side of the plot to the right side of the plot. Trace 316 represents manual clutch position.

The ninth plot from the top of FIG. 3 is a plot of engine speed versus time. The vertical axis represents engine speed and the engine speed increases in the direction of the vertical axis arrow. The horizontal axis represents time and time increases from the left side of the plot to the right side of the plot. Trace 318 represents engine speed.

The tenth plot from the top of FIG. 3 is a plot of vehicle operating mode versus time. The vertical axis represents vehicle operating mode and the vehicle operating mode is a sport or performance mode when trace 320 is at a level near the vertical axis arrow. The vehicle is operating in an economy mode when trace 320 is near the horizontal axis. The horizontal axis represents time and time increases from the left side of the plot to the right side of the plot. Trace 320 represents the vehicle operating mode.

At time t0, the requested wheel torque is at a middle level and the base engine torque is at a middle level. The base electric machine torque is at a middle level and the additive engine and additive electric machine torques are zero. The desired rate of engine and electric machine acceleration during a transmission gear shift is zero and the gear selector is in third gear. The manual clutch is fully closed and engine speed is at a middle level. The vehicle is operating in economy mode.

At time t1, the requested wheel torque remains at a middle level and the base engine torque remains at the middle level. The base electric machine torque also remains at a middle level and the additive engine and electric machine torques are zero. The desired rate of engine and electric machine acceleration when the clutch begins to be released is zero. The human driver begins to move the gear selector from third gear and the human driver begins to open the manual clutch. The vehicle continues operating in economy mode.

Between time t1 and time t2, the human driver fully opens the clutch and continues to move the gear shift lever. The other vehicle operating conditions remain at their previous levels.

At time t2, the requested wheel torque remains at a middle level and the base engine torque remains at the middle level. The base electric machine torque also remains at a middle level. The human driver moves the gear selector to its final position of second gear and the clutch is fully open. The desired rate of engine and electric machine acceleration increases once second gear is engaged (e.g., the transmission output shaft is coupled to the transmission input shaft via second gear) so that the engine may be accelerated to the expected or anticipated speed of the transmission input shaft. The additive engine torque and electric machine torque begin to increase after the controller determines that a downshift is in progress and that the destination gear is second gear. The engine speed is at its previous level at time t2, but it begins to increase as the additive engine and electric machine torque increase to accelerate the engine and the electric machine to the expected or anticipated speed of the transmission input shaft. The vehicle continues operating in economy mode.

Between time t2 and time t3, desired rate of engine acceleration increases and then it decreases as engine speed approaches transmission input shaft speed. The additive engine torque and the additive electric machine torque increase and then they decrease when the engine rotational speed is within a threshold of the transmission input shaft rotational speed. The engine speed has increased to match the increase in transmission input shaft rotational speed that occurs when second gear is fully engaged while the manual clutch is open. The requested wheel torque and the base engine torque remain at their respective previous levels. The base electric machine torque remains at its previous level and the gear selector remains engaged in second gear. The vehicle remains in economy mode.

At time t3, the human driver begins to release (e.g., close) the manual clutch and the additive engine and the additive electric machine torques are reduced to zero. The base engine and electric machine torques remain at their respective previous levels. The desired rate of engine acceleration is reduced to zero. The gear selector remains engaged in second gear and the engine speed begins to decrease as the vehicle decelerates. The vehicle remains engaged in economy mode.

At time t4, the human driver initiates a second downshift. The requested wheel torque remains at a middle level and the base engine torque remains at the middle level. The base electric machine torque also remains at a middle level and the additive engine and electric machine torques are zero. The desired rate of engine and electric machine acceleration when the clutch begins to be released is zero. The human driver begins to move the gear selector from second gear and the human driver begins to open the manual clutch. The vehicle continues operating in economy mode.

Between time t4 and time t5, the human driver fully opens the clutch and continues to move the gear shift lever. The other vehicle operating conditions remain at their previous levels.

At time t5, the requested wheel torque remains at a middle level and the base engine torque remains at the middle level. The base electric machine torque also remains at a middle level. The human driver moves the gear selector to its final position of first gear and the clutch is fully open. The desired rate of engine and electric machine acceleration increases once first gear is engaged so that the engine may be accelerated to the expected or anticipated speed of the transmission input shaft. However, the desired rate of engine acceleration is greater after time t5 than it was after time t2. The higher rate of engine acceleration may be based on the gear being exited (e.g., second gear) and the gear being engaged (e.g., first gear). The higher rate of engine acceleration may permit quicker downshifts in lower gears where quicker downshifts may be preferred. The additive engine torque and electric machine torque begin to increase after the controller determines that a downshift is in progress and that the destination gear is first gear. The additive engine torque and electric machine torque after time t5 is greater than the additive engine torque and electric machine torque after time t2 so that a quicker downshift may be performed. The engine speed is at its previous level at time t5, but it begins to increase as the additive engine and electric machine torque increase to accelerate the engine and the electric machine to the expected or anticipated speed of the transmission input shaft. The vehicle continues operating in economy mode.

Between time t5 and time t6, desired rate of engine acceleration increases and then it decreases as engine speed approaches transmission input shaft speed. The additive engine torque and the additive electric machine torque increase and then they decrease when the engine rotational speed is within a threshold of the transmission input shaft rotational speed. The engine speed has increased to match the increase in transmission input shaft rotational speed that occurs when first gear is fully engaged while the manual clutch is open. The requested wheel torque and the base engine torque remain at their respective previous levels. The base electric machine torque remains at its previous level and the gear selector remains engaged in first gear. The vehicle remains in economy mode.

At time t6, the human driver begins to release (e.g., close) the manual clutch and the additive engine and the additive electric machine torques are reduced to zero. The base engine and electric machine torques remain at their respective previous levels. The desired rate of engine acceleration is reduced to zero. The gear selector remains engaged in first gear and the engine speed begins to decrease as the vehicle decelerates. The vehicle remains engaged in economy mode.

A break in time occurs between time t6 and time t7. The vehicle may continue to operate or it may be stopped during the break in time. Just before time t7, the vehicle is shown operating at conditions that are similar to the conditions the vehicle operated under at time t0, except the vehicle is now operating in a sport or performance mode where the human driver may expect quicker manual gear shifts.

At time t7, the requested wheel torque remains at a middle level and the base engine torque remains at the middle level. The base electric machine torque also remains at a middle level and the additive engine and electric machine torques are zero. The desired rate of engine and electric machine acceleration when the clutch begins to be released is zero. The human driver begins to move the gear selector from third gear and the human driver begins to open the manual clutch. The vehicle continues operating in sport mode.

Between time t7 and time t8, the human driver fully opens the clutch and continues to move the gear shift lever. The other vehicle operating conditions remain at their previous levels.

At time t8, the requested wheel torque remains at a middle level and the base engine torque remains at the middle level. The base electric machine torque also remains at a middle level. The human driver moves the gear selector to its final position of second gear and the clutch is fully open. The desired rate of engine and electric machine acceleration increases once second gear is engaged (e.g., the transmission output shaft is coupled to the transmission input shaft via second gear) so that the engine may be accelerated to the expected or anticipated speed of the transmission input shaft. The desired rate of engine and electric machine acceleration is increased to a higher level than it was at time t2 because the vehicle is engaged in performance mode. The additive engine torque and additive electric machine torque begin to increase after the controller determines that a downshift is in progress and that the destination gear is second gear. The additive engine torque and the additive electric machine torques are increased to higher levels after time t8 than after time t2 because the desired rate of engine acceleration at time t8 is higher than at time t2. The engine speed is at its previous level at time t8, but it begins to increase as the additive engine and electric machine torque increase to accelerate the engine and the electric machine to the expected or anticipated speed of the transmission input shaft. The vehicle continues operating in sport mode.

Between time t8 and time t9, desired rate of engine acceleration increases and then it decreases as engine speed approaches transmission input shaft speed. The additive engine torque and the additive electric machine torque increase and then they decrease when the engine rotational speed is within a threshold of the transmission input shaft rotational speed. The engine speed has increased to match the increase in transmission input shaft rotational speed that occurs when second gear is fully engaged while the manual clutch is open. The requested wheel torque and the base engine torque remain at their respective previous levels. The base electric machine torque remains at its previous level and the gear selector remains engaged in second gear. The vehicle remains in sport mode.

At time t9, the human driver begins to release (e.g., close) the manual clutch and the additive engine and the additive electric machine torques are reduced to zero. The base engine and electric machine torques remain at their respective previous levels. The desired rate of engine acceleration is reduced to zero. The gear selector remains engaged in second gear and the engine speed begins to decrease as the vehicle decelerates. The vehicle remains engaged in sport mode.

At time t10, the human driver initiates a second downshift. The requested wheel torque remains at a middle level and the base engine torque remains at the middle level. The base electric machine torque also remains at a middle level and the additive engine and electric machine torques are zero. The desired rate of engine and electric machine acceleration when the clutch begins to be released is zero. The human driver begins to move the gear selector from second gear and the human driver begins to open the manual clutch. The vehicle continues operating in sport mode.

Between time t10 and time t11, the human driver fully opens the clutch and continues to move the gear shift lever. The other vehicle operating conditions remain at their previous levels.

At time t11, the requested wheel torque remains at a middle level and the base engine torque remains at the middle level. The base electric machine torque also remains at a middle level. The human driver moves the gear selector to its final position of first gear and the clutch is fully open. The desired rate of engine and electric machine acceleration increases once first gear is engaged so that the engine may be accelerated to the expected or anticipated speed of the transmission input shaft. However, the desired rate of engine acceleration is greater after time t11 than it was after time t5. The higher rate of engine acceleration may be based on the vehicle being in a sport mode. The higher rate of engine acceleration may permit even quicker downshifts in lower gears where quicker downshifts may be preferred. The additive engine torque and electric machine torque begin to increase after the controller determines that a downshift is in progress and the destination gear is first gear. The additive engine torque and electric machine torque after time t11 is greater than the additive engine torque and electric machine torque after time t5 so that a quicker downshift may be performed. The engine speed is at its previous level at time t11, but it begins to increase as the additive engine and electric machine torque increase to accelerate the engine and the electric machine to the expected or anticipated speed of the transmission input shaft. The vehicle continues operating in sport mode.

Between time t11 and time t12, desired rate of engine acceleration increases and then it decreases as engine speed approaches transmission input shaft speed. The additive engine torque and the additive electric machine torque increase and then they decrease when the engine rotational speed is within a threshold of the transmission input shaft rotational speed. The engine speed has increased to match the increase in transmission input shaft rotational speed that occurs when first gear is fully engaged while the manual clutch is open. The requested wheel torque and the base engine torque remain at their respective previous levels. The base electric machine torque remains at its previous level and the gear selector remains engaged in first gear. The vehicle remains in sport mode.

At time t12, the human driver begins to release (e.g., close) the manual clutch and the additive engine and the additive electric machine torques are reduced to zero. The base engine and electric machine torques remain at their respective previous levels. The desired rate of engine acceleration is reduced to zero. The gear selector remains engaged in first gear and the engine speed begins to decrease as the vehicle decelerates. The vehicle remains engaged in sport mode.

Thus, a rate of engine and electric machine acceleration may be adjusted according to driving modes and gears being exited and gears being entered. The rate of engine and electric machine acceleration may affect an amount of time in which a smooth gear shift may be performed. However, increasing the rate of engine and electric machine acceleration may affect energy consumption by the vehicle. As such, the vehicle's human operator may be able to preferentially select a vehicle's operating mode to achieve desired vehicle performance levels and energy consumption levels.

Figure 4:
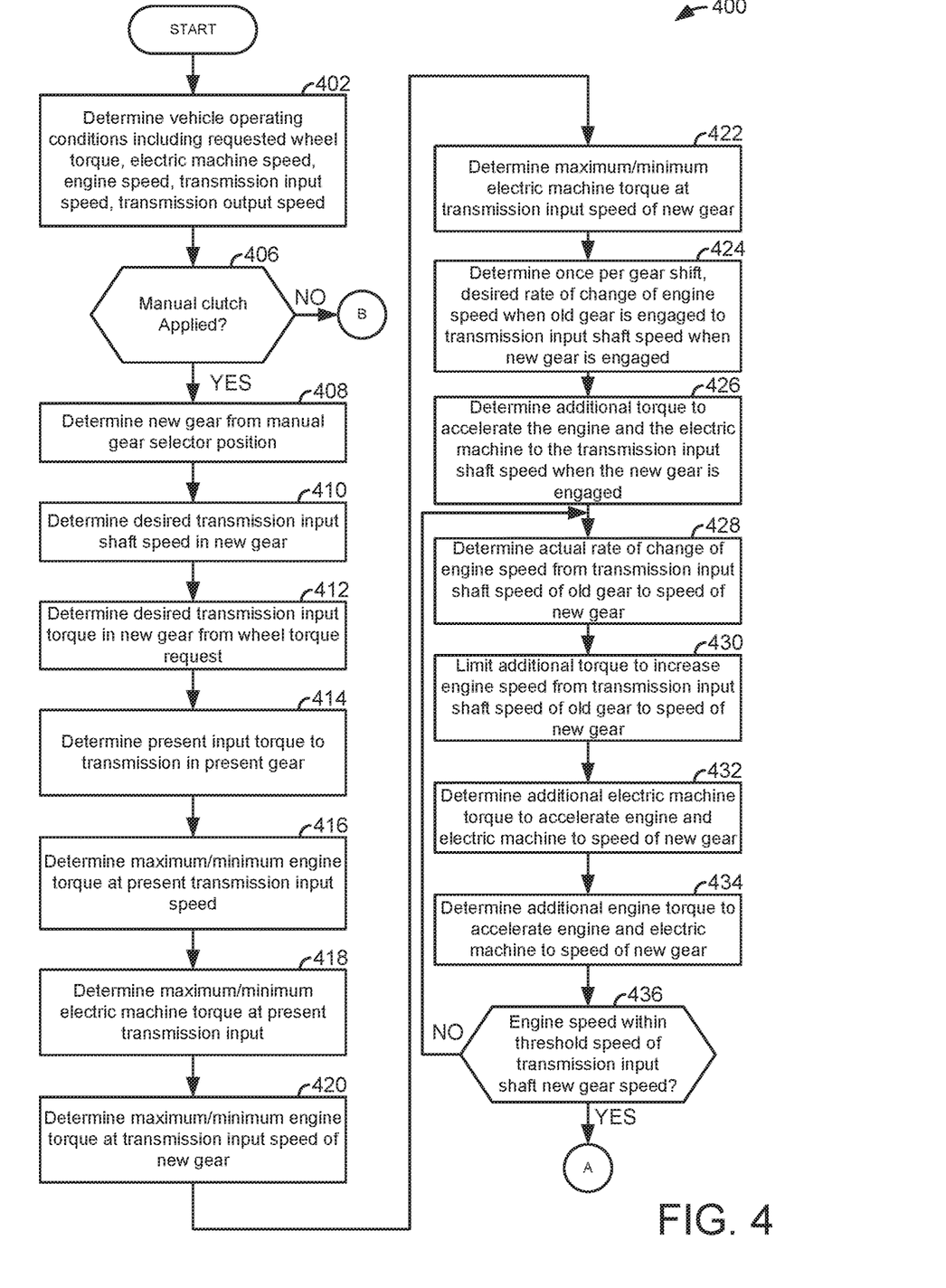
FIGS. 4 and 5 show an example method for operating a driveline of a vehicle.
Figure 5:
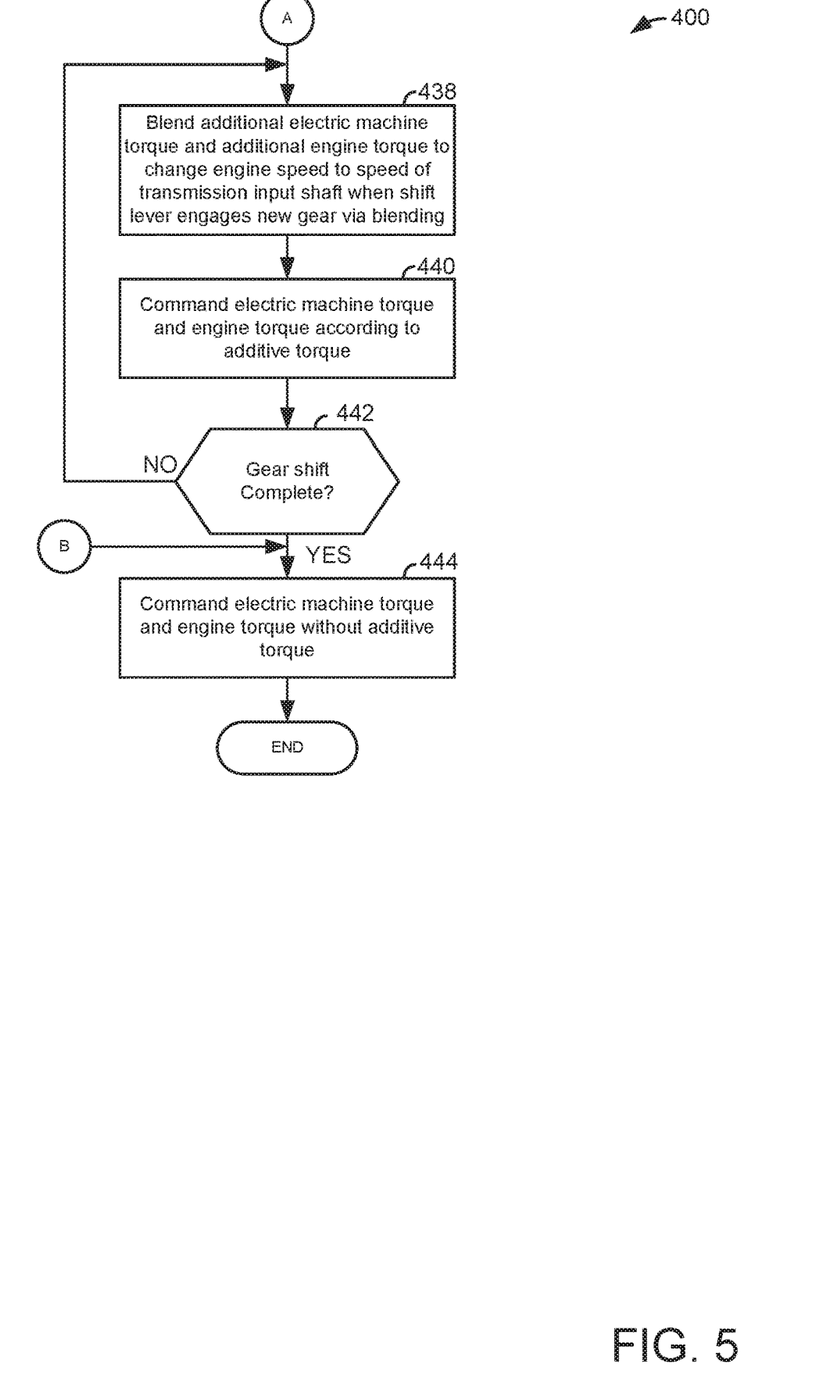
Figure 6:
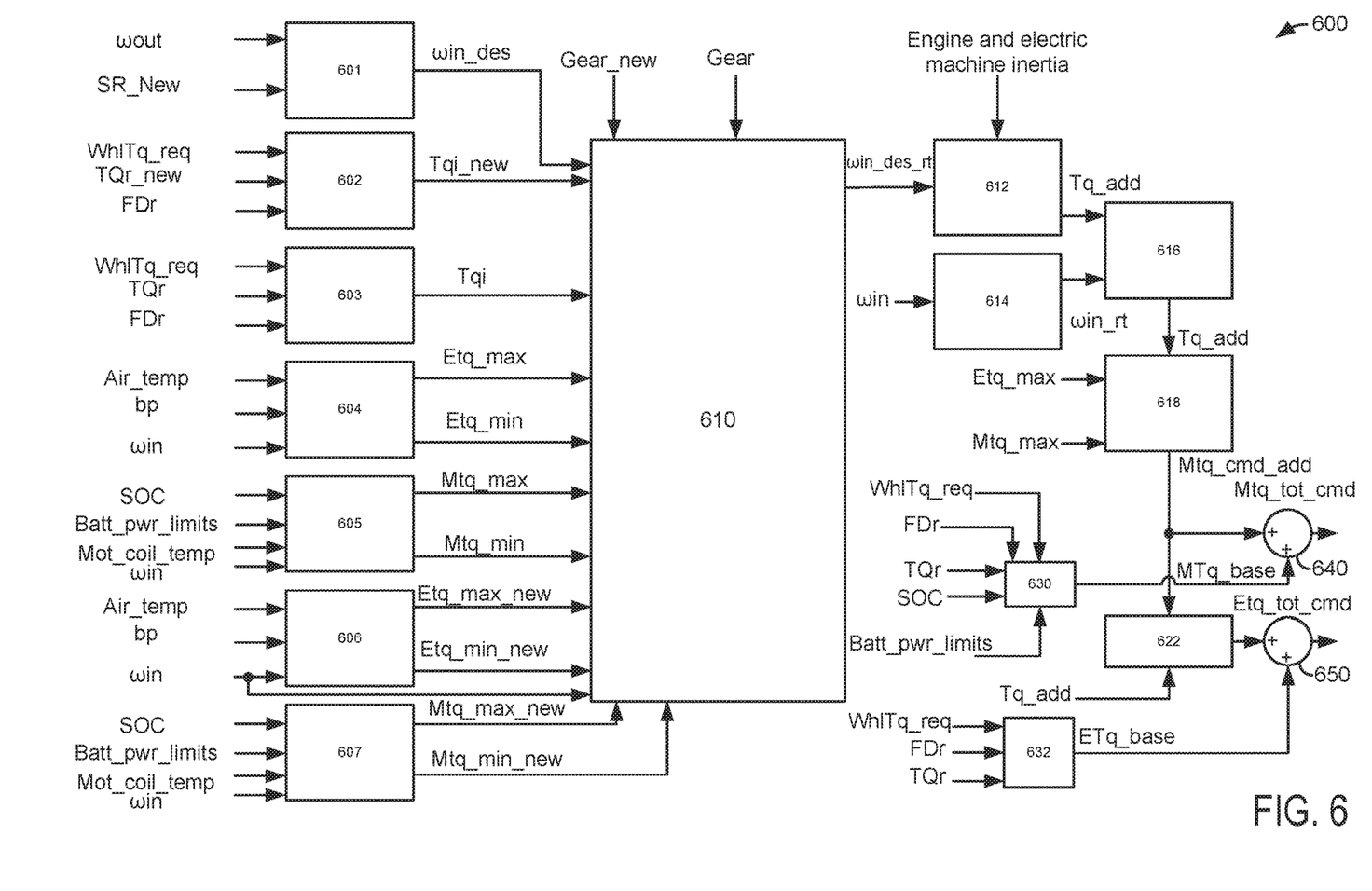
FIG. 6 shows an example controller block diagram for shifting a manual transmission.

Referring now to FIGS. 4 and 5, a method for operating a vehicle is shown. The method of FIGS. 4 and 5 may be at least partially implemented as executable instructions stored in non-transitory controller memory. The method of FIGS. 4 and 5 may cooperate with and be a part of the system of FIGS. 1 and 2. At least portions of the method of FIGS. 4 and 5 may be actions taken in the physical world via controller 12 to transform operating conditions of a vehicle. Further, the method of FIGS. 4 and 5 along with the system of FIGS. 1 and 2 may provide the sequence shown in FIG. 3. The engine and electric machine are operating during the method of FIGS. 4 and 5.

At 402, method 400 determines vehicle operating conditions. Vehicle operating conditions may be determined via data input to a controller from vehicle sensors and actuators. Vehicle operating conditions may include but are not limited to engine speed, vehicle speed, presently selected transmission gear, electrical machine speed, transmission input shaft speed, transmission output shaft speed, accelerator pedal position, clutch pedal position, requested wheel torque, and brake pedal position. Requested wheel torque may be determined via accelerator pedal position and vehicle speed. In particular, a table or function of empirically determined requested wheel torque values may be referenced or indexed via accelerator pedal position and vehicle speed. Method 400 proceeds to 406 after vehicle operating conditions are determined.

At 406, method 400 judges if the manual transmission's clutch is applied (e.g., disengaged and open). In one example, method 400 may judge that manual transmission clutch is disengaged based on output of a clutch pedal position sensor. If method 400 judges that the manually operated clutch is disengaged, the answer is yes and method 400 proceeds to 408. Otherwise, the answer is no and method 400 proceeds to 444.

At 444, method 400 commands the engine torque and the electric machine torque without additive engine torque and electric machine torque. In one example, the engine torque is commanded to base engine torque (ETq_base) and the electric machine torque is commanded to base electric machine torque (MTq_base) that are based on a requested wheel torque. The requested wheel torque may be partitioned into a base engine torque and a base electric machine torque. The base engine and base electric machine torque commands may be determined via tables or functions that output base engine torque and base electric machine torque responsive to requested wheel torque, battery state of charge (SOC), battery temperature, engine temperature, and other vehicle operating conditions. The base engine torque command and the base electric machine torque command are output to the engine and the electric machine. The base electric machine torque may be determined via the following equation:

$$MTq\_base = fnMTq\_base(WhlTq\_req/TQr/FDr, SOC, batt\_pwr\_limits)$$

where MTq_base is the base electric machine torque, fnMTq_base is a function that outputs the base electric machine torque when referenced by the requested wheel torque divided by the torque ratio of the presently engaged gear, and divided by the final drive ratio (WhlTq_rq/TQr/FDr), battery state of charge (SOC), and battery power limits (batt_pwr_limits). The base engine torque may be provided via the following equation:

$$ETq\_base=(WhlTq\_req/TQr/FDr)-MTq\_base$$

where ETq_base is the base engine torque. The engine and electric machine provide the base engine and base electric machine torques. Method 400 proceeds to exit after the powertrain torque is output.

At 408, method 400 determines a new transmission gear (e.g., a transmission gear that is being engaged during the manual transmission gear shift such that the new transmission gear may transfer torque from the transmission input shaft to the transmission output shaft). The new transmission gear may be determined from a position of a shift selector (e.g., 217 of FIG. 2) and recognizing that the shift selector is in a different position than the position it was in just before the manual clutch was applied. Method 400 proceeds to 410 after determining the new transmission gear.

At 410, method 400 determines a desired transmission input shaft speed. The desired transmission input shaft speed may be determined via the following equation:

$$\omega in\_des=\omega out \cdot SR\_New$$

where ωin_des is the desired rotational speed of the transmission input shaft, ωout is the rotational speed of the transmission output shaft, and SR_New is the speed ratio (e.g., input speed/output speed) of the newly selected transmission gear. Method 400 proceeds to 412.

At 412, method 400 determines the desired transmission input torque (e.g., torque delivered to the transmission input shaft) in the newly engage transmission gear from the requested wheel torque. The desired transmission input torque may be determined via the following equation:

$$Tqi\_new = \frac{WhlTq\_req}{TQr\_new/FDr}$$

where Tqi_new is the desired transmission input torque in the newly selected gear, WhlTq_req is the requested wheel torque, TQr_new is the torque ratio of the newly selected gear, and FDr is the ratio of the final drive (e.g., axle ratio). Note that the computations involving the new gear may be delayed until the new gear is indicated by the gear shift selector. Method 400 proceeds to 414.

At 414, method 400 determines the present transmission input torque (e.g., torque delivered to the transmission input shaft just before the manual clutch was applied) in the old gear or the gear that was engaged just before the manual clutch was opened. The present transmission input torque may be determined via the following equation:

$$Tql = \frac{WhlTq\_req}{TQr/FDr}$$

where Tql is the present transmission input torque in the old gear, WhlTq_req is the requested wheel torque, TQr is the torque ratio of the old selected gear, and FDr is the ratio of the final drive (e.g., axle ratio). Method 400 proceeds to 416.

At 416, method 400 determines maximum and minimum engine torques at the present transmission input shaft speed. The present transmission input rotational speed and the present engine rotational speed may be equal or nearly equal when the manual clutch has been just opened. The maximum and minimum engine torques at the present transmission speed may be determined via the following equations:

$$Etq\_max=fn\_etq\_max\_table=(\omega in, air\_temp, bp)$$

$$Etq\_min=fn\_etq\_min\_table=(\omega in, air\_temp, bp)$$

where Etq_max is the maximum engine torque, Etq_min is the minimum engine torque, fn_etq_max_table is table that stores empirically determined maximum engine torque values, fn_etq_min_table is table that stores empirically determined minimum engine torque values. The variable ωin is the transmission input shaft rotational speed, air_temp is ambient air temperature, and bp is present barometric pressure. Method 400 proceeds to 418.

At 418, method 400 determines maximum and minimum electric machine torques at the present transmission input shaft speed. The maximum and minimum electric machine torques at the present transmission speed may be determined via the following equations:

$$Mtq\_max=fn\_mtq\_max\_table=(\omega in, SOC, batt\_pwr\_limits, mot\_coil\_temp)$$

$$Mtq\_min=fn\_mtq\_min\_table=(\omega in, SOC, batt\_pwr\_limits, mot\_coil\_temp)$$

where Mtq_max is the maximum electric machine torque, Mtq_min is the minimum electric machine torque, fn_mtq_max_table is table that stores empirically determined maximum electric machine torque values, fn_mtq_min_table is table that stores empirically determined minimum electric machine torque values. The variable SOC is battery state of charge, batt_pwr_lim is battery power limits, and mot_coil_temp is electric machine coil temperature. Method 400 proceeds to 420.

At 420, method 400 determines maximum and minimum engine torques at the desired transmission input shaft speed. The maximum and minimum engine torques at the desired transmission input speed may be determined via the following equations:

$$Etq\_max=fn\_etq\_max\_table=(\omega in\_des, air\_temp, bp)$$

$$Etq\_min=fn\_etq\_min\_table=(\omega in\_des, air\_temp, bp)$$

where Etq_max is the maximum engine torque, Etq_min is the minimum engine torque, fn_etq_max_table is table that stores empirically determined maximum engine torque values, fn_etq_min_table is table that stores empirically determined minimum engine torque values. The variable ωin_des is the desired transmission input shaft rotational speed, air_temp is ambient air temperature, and bp is present barometric pressure. Method 400 proceeds to 418.

At 422, method 400 determines maximum and minimum electric machine torques at the desired transmission input shaft speed. The maximum and minimum electric machine torques at the desired transmission input speed may be determined via the following equations:

$$Mtq\_max=fn\_mtq\_max\_table=(\omega in\_des, SOC, batt\_pwr\_limits, mot\_coil\_temp)$$

$$Mtq\_min=fn\_mtq\_min\_table=(\omega in\_des, SOC, batt\_pwr\_limits, mot\_coil\_temp)$$

where Mtq_max is the maximum electric machine torque, Mtq_min is the minimum electric machine torque, fn_mtq_max_table is table that stores empirically determined maximum electric machine torque values, fn_mtq_min_table is table that stores empirically determined minimum electric machine torque values. The variable SOC is battery state of charge, batt_pwr_lim is battery power limits, ω_des is the desired transmission input shaft rotational speed, and mot_coil_temp is electric machine coil temperature. Method 400 proceeds to 424.

At 424, method determines a desired rate of change of the rotational speed of the engine from the speed of the engine when the old gear was engaged to rotational speed of the transmission input shaft when the new gear is engaged while the manual clutch is still open. In one example, the desired rate of engine speed change from a speed of the engine just before the manual clutch was opened to a speed of the transmission input shaft just after the new gear is engaged via the shift lever may be determined via the following equation:

$$\omega in\_des\_rt = \frac{(\omega in\_des - \omega in)}{fn\_des\_time(args)}$$

where ω_des_rt is the desired rate of engine rotational speed change from a rotational speed of the engine just before the manual clutch was opened while the transmission was engaged in the old gear to a rotational speed of the transmission input shaft when the shifter engages the new gear while the manual clutch is still open. The rotational speed of the transmission input shaft is a function of the vehicle speed and the ratio of the new gear. The variable win is the transmission input shaft rotational speed just before the manual clutch was opened, which is a same speed as engine speed, while the transmission was engaged in the old gear. The variable ωin_des is the desired rotational speed of the transmission input shaft (e.g., rotational speed of the transmission input shaft when the new gear is engaged via the shift lever while the manual clutch is open). The variable fn_des_time(args) is a function that outputs a requested amount of time for the engine to accelerate from ωin to ωin_des, and where the variable args represents arguments that reference the function. The arguments include Gear_n (the number of the new gear), Gear (the number of the gear that was engaged at the time just before the manual clutch was opened), Tqi the transmission input torque in the old gear at the time just before when the manual clutch was opened, Tqi_new is the desired transmission input torque in the newly selected gear, Etq_max (e.g., is the maximum engine torque at the engine speed at the time just before the manual clutch was opened), Etq_min (e.g., is the minimum engine torque at the engine speed at the time just before the manual clutch was opened), Etq_max_new (e.g., is the maximum engine torque at the speed of the transmission input shaft at the time when the shifter engages the new gear and the manual clutch is fully open), Etq_min_new (e.g., is the minimum engine torque at the speed of the transmission input shaft at the time when the shifter engages the new gear and the manual clutch is fully open), Mtq_max (e.g., is the maximum electric machine torque at the speed of the transmission input shaft at the time just before the manual clutch is fully opened), Mtq_min (e.g., is the minimum electric machine torque at the speed of the transmission input shaft at the time just before the manual clutch is fully opened), Mtq_max_new (e.g., is the maximum electric machine torque at the speed of the transmission input shaft at the time when the shifter engages the new gear and the manual clutch is fully open), Mtq_min_new (e.g., is the minimum electric machine torque at the speed of the transmission input shaft at the time when the shifter engages the new gear and the manual clutch is fully open). The value of ωin_des_rt may be determined once during the gear shift after the new gear is engaged via the shift lever while the manual clutch is fully open. Method 400 proceeds to 426.

At 426, method 400 determines an additional amount of torque to accelerate the engine and the electric machine to the transmission input shaft speed after the new gear has been engaged via the shift lever while the manual clutch is fully open. Method 400 may determine the additional amount of torque to accelerate the engine and the electric machine to the transmission input shaft speed after the new gear has been engaged via the shift lever while the manual clutch is fully open via the following equation:

$$Tq\_add = fn\_ttq(Iin, \omega in\_des\_rt)$$

where Tq_add is an amount of torque to accelerate the engine and electric machine to the transmission input shaft speed after the new gear has been engaged via the shift lever while the manual clutch is fully open, fn_ttq is a function or table of calculated or empirically determined torque amounts to accelerate the engine and the electric machine to the transmission input shaft speed after the new gear has been engaged via the shift lever while the manual clutch is fully open, Iin is the inertia of the engine and the electric machine, and ωin_des_rt is the desired rate of engine rotational speed change from a rotational speed of the engine just before the manual clutch was opened while the transmission was engaged in the old gear to a rotational speed of the transmission input shaft when the shifter engages the new gear while the manual clutch is still open. Method 400 proceeds to 428.

At 428, method 400 determines an actual rate of engine and electric machine speed change. In one example, the actual rate of engine and electric machine speed change is determined via the following equation:

$$\omega in\_rt = \frac{d\omega in}{dt}$$

where ωin_rt is the actual rate of engine and electric machine speed change and dωin/dt is the derivative of the actual engine and electric machine rotational speed. Method 400 proceeds to 430.

At 430, method 400 limits or constrains to a threshold level additional torque provided by the engine and electric machine if the human driver changes the requested wheel torque during the gear shift. The additional amount of torque provided by the engine and/or electric machine to accelerate the engine and the electric machine may be limited or constrained to less than a threshold amount of torque via the following equation:

$$Tq\_add = Tq\_add \cdot fn(\omega in\_rt, \omega in\_des\_rt)$$

where Tq_add is additional torque to accelerate or decelerate the engine and electric machine during the manual gear shift, fn is a function that returns a scalar real number multiplier (e.g., 0.9) and values in the function are indexed or referenced via the ω_des_rt is the desired rate of engine rotational speed change from a rotational speed of the engine just before the manual clutch was opened while the transmission was engaged in the old gear to a rotational speed of the transmission input shaft when the shifter engages the new gear while the manual clutch is still open and win rt the actual rate of engine and electric machine speed change. Method 400 proceeds to 432.

At 432, method 400 determines an additional amount of electric machine torque to accelerate or decelerate the electric machine and the engine to the speed of the transmission input shaft after the gear selector engages the new gear while the manual clutch is fully open. Method 400 determines the additional amount of electric machine torque via the following equation:

$$Mtq\_cmd\_add=fn\_mot\_portion(Tq\_add,Mtq\_max, Mtq\_min,Etq\_max,Etq\_min)$$

where Mtq_cmd_add is the additional amount of torque that is commanded to the electric machine to provide during the present manual gear shift, fn_mot_portion is a function that returns an electric machine torque that is added to the base electric machine torque during the manual gear shift, Tq_add is the additional torque to accelerate or decelerate the engine and the electric machine to the input shaft speed of the transmission, Mtq_max is a maximum electric machine torque, Mtq_min is a minimum electric machine torque, Etq_max is a maximum engine torque, and Etq_min is a minimum engine torque. Values in the function fn_mot_portion may be empirically determined via operating the vehicle on a chassis roll dynamometer and manually shifting gears. The electric machine is commanded to the base electric machine torque as plus the Mtq_cmd_add torque amount as described at 440. Method 400 proceeds to 434.

At 434, method 400 determines an additional amount of engine torque to accelerate or decelerate the electric machine and the engine to the speed of the transmission input shaft after the gear selector engages the new gear while the manual clutch is fully open. Method 400 determines the additional amount of engine torque via the following equation:

$$Etq\_cmd\_add=Tq\_add-Mtq\_cmd\_add$$

where Etq_cmd_add is the additional amount of torque that is commanded to the engine during the present manual gear shift, Tq_add is the additional torque as described at 430, and Mtq_cmd_add is the additional amount of torque that is commanded to the electric machine to provide during the present manual gear shift. The engine is commanded to the base engine torque plus the Etq_cmd_add torque amount as described at 440. Method 400 proceeds to 436.

At 436, method 400 judges if engine speed is within a threshold speed of the transmission input shaft speed after the shifter engages the new gear. For example, if the transmission is downshifted and the transmission input shaft speed increases from 2000 RPM to 2600 RPM and the threshold speed is 100 RPM, then method 400 judges that engine speed is within the threshold speed of 2600 RPM when engine speed is greater than 2500 RPM and less than 2600 RPM. If method 400 judges that engine speed is within the threshold speed of transmission input shaft speed, then the answer is yes and method 400 proceeds to 438. Otherwise, the answer is no and method 400 returns to 428.

At 438, method 400 blends the additional engine torque and the additional electric machine torque to change engine speed and electric machine speed to the speed of the transmission input shaft when the shift lever engages the new gear and when the manual clutch is fully open. Method 400 first determines a blend ratio via the following equation:

$$Tot\_blend\_ratio=fn\_tot\_blend(\omega in,\omega in\_des,Tq\_add)$$

where Tot_blend_ratio is a blend ratio for adjusting the engine additive torque and the electric machine additive torque, fn_tot_blend is a function that returns empirically determined blend ratio values, ωin is the actual rotational speed of the engine and the electric machine, ω_des is the desired rotational speed of the transmission input shaft when the new gear is engaged, Tq_add is the additional amount of torque to accelerate the engine and the electric machine to the transmission input shaft speed after the new gear has been engaged via the shift lever while the manual clutch is fully open. Values in fn_tot_blend may be determined via operating the vehicle on a chassis dynamometer and performing manual gear shifts. The electric machine and engine speed may be monitored as they approach the desired input speed of the transmission. Values in the fn_tot_blend function may be adjusted until the engine and electric machine speed converge to the desired transmission input shaft speed in a desired amount of time. In one example, values in the function fn_tot_blend may be adjusted so that they decrease as ωin approaches ωin_des.

After the blend ratio value is determined, the electric machine additive torque and the engine additive torque may be adjusted via the blend ratio according to the following equations:

$$Mtq\_cmd\_add=Mtq\_cmd\_add \cdot Tot\_blend\_ratio$$

$$Etq\_cmd\_add=Etq\_cmd\_add \cdot Tot\_blend\_ratio$$

where tot_blend_ratio is the total blend ratio, Mtq_cmd_add is the additive electric machine torque, and Etq_cmd_add is the additive engine torque. Method 400 proceeds to 440.

At 440, method 400 commands the electric machine torque and the engine torque. The electric machine torque and the engine torque are commanded according to the following equations:

$$Mtq\_tot\_cmd=MTq\_base+Mtq\_cmd\_add$$

where Mtq_tot_cmd is the total torque commanded to the electric machine, MTq_base is the base electric machine torque, and Mtq_cmd_add is the additive electric machine torque that is applied to improve manual gear shifting. The engine torque is commanded via the following equation:

$$Etq\_tot\_cmd=ETq\_base+Etq\_cmd\_add$$

where Etq_tot_cmd is the total torque commanded to the engine, ETq_base is the base engine torque, and Etq_cmd_add is the additive engine torque that is applied to improve manual gear shifting. Method 400 proceeds to 442.

At 442, method 400 judges if the manual gear shift is complete. The manual gear shift may be judged to be complete when a new gear is engaged and the manual clutch is fully closed. If method 400 judges that the manual gear shift is complete, the answer is yes and method 400 proceeds to 444. Otherwise, the answer is no and method 400 returns to 438.

In this way, the electric machine torque and the engine torque commands may include a base torque plus an adjustment torque that may be applied during manual gear shifting to reduce manual gear shifting time and driveline torque disturbances.

Thus, the method of FIGS. 4 and 5 provides for a vehicle operating method, comprising: adjusting a speed of at least one torque source via a controller responsive to desired rate of speed change that is function of an engaged gear before a manual gear shift and a gear engaged after the manual gear shift while a manually operated clutch is open. The method includes where the desired rate of speed change is also a function of a vehicle driving mode. The method includes where the desired rate of speed change is also a function of a rated torque of an electric machine at a present speed of the electric machine. The method includes where the rate of speed change is also a function of a maximum engine torque at a present speed of an engine. The method includes where the rate of speed change is also a function of a torque applied to the manually operated clutch before the manual gear shift. The method includes where adjusting speed of the at least one torque source includes adjusting torque of an electric machine. The method includes where adjusting speed of the at least one torque source includes adjusting torque of an internal combustion engine. The method includes where the manually operated clutch selectively couples the at least one torque source to a transmission input shaft.

The method of FIGS. 4 and 5 also provides for a method for operating a vehicle, comprising: via a controller, adjusting a speed of at least one torque source via adjusting a torque of the at least one torque source responsive to an inertia of the at least one torque source and a desired rate of speed change of the at least one torque source. The method includes where the speed is adjusted when a manually operated clutch that selectively couples the at least one torque source to a transmission input shaft is fully open. The method includes where the desired rate of speed change is a function of an engaged gear before a manual gear shift and an engaged gear after the manual gear shift. The method includes where the manual gear shift is at least partially performed via a human driver. The method includes where the desired rate of speed change is a function of a maximum electric machine torque. The method includes where the desired rate of speed change is a function of a maximum internal combustion engine torque at a speed of an internal combustion engine when the manually operated clutch is disengaged.

Referring now to FIG. 6, a controller block diagram for shifting a manual transmission is shown. The controller may be manifest as executable instructions stored in controller memory and portions of the controller may be included in the method of FIGS. 4 and 5. Further, aspects of the controller interact with devices in the real world to operate a vehicle.

Block 601 represents where a calculation is performed by the controller to determine the desired transmission input shaft speed. The calculation utilizes a speed ratio (SR) of the new gear being engaged during the manual shift and transmission output shaft speed. Block 601 outputs the desired transmission input shaft speed ω_des to block 610.

Block 602 represents where a calculation is performed by the controller to determine the desired torque that is input to the transmission input shaft in the new gear during the manual gear shift. The calculation utilizes the requested wheel torque, the final drive ration, and the torque ratio of the newly engaged gear. Block 602 outputs the desired transmission input shaft torque in the new gear Tqi_new to block 610.

Block 603 represents where a calculation is performed by the controller to determine the desired torque that is input to the transmission input shaft in the old gear during the manual gear shift. The calculation utilizes the requested wheel torque, the final drive ration, and the torque ratio of the old engaged gear. Block 603 outputs the desired transmission input shaft torque in the new gear Tqi to block 610.

Block 604 represents functions fn_etq_max_table and fn_etq_min_table that output maximum engine torque at the present engine speed Etq_max and the minimum engine torque at the present engine speed Etq_min. Barometric pressure, air temperature, and the present engine speed are input to the functions. Block 604 outputs the maximum engine torque and minimum engine torque to block 610.

Block 605 represents functions fn_mtq_max_table and fn_mtq_min_table that output maximum electric machine torque at the present electric machine speed Mtq_max and the minimum electric machine torque at the present electric machine speed Mtq_min. Battery SOC, battery power limits, electric machine speed, and electric machine coil temperature are input to the functions. Block 605 outputs the maximum electric machine torque and minimum electric machine torque to block 610.

Block 606 represents functions fn_etq_max_table and fn_etq_min_table that output maximum engine torque at the present engine speed Etq_max in the new gear and the minimum engine torque at the present engine speed Etq_min in the new gear. Barometric pressure, air temperature, and the present engine speed are input to the functions. Block 606 outputs the maximum engine torque in the new gear and minimum engine torque in the new gear to block 610.

Block 607 represents functions fn_mtq_max_table and fn_mtq_min_table that output maximum electric machine torque at the present electric machine speed in the new gear Mtq_max and the minimum electric machine torque at the present electric machine speed in the new gear Mtq_min. Battery SOC, battery power limits, electric machine speed, and electric machine coil temperature are input to the functions. Block 607 outputs the maximum electric machine torque in the new gear and minimum electric machine torque in the new gear to block 610.

Block 610 represents a function fn_des_time and a calculation that applies the function to determine a desired rate of engine speed change. The values in the function fn_des_time may be determined via operating a vehicle on a chassis dynamometer and performing manual transmission gear shifts while observing the time used to complete the shift, the old gear, the new gear, requested torque and the other inputs to the function. The values in the function may then be manipulated to such that a desired time to perform transmission gear shifting is output by the function. The desired time to perform the manual gear shifts is then applied as a divisor and transmission input shaft speeds to determine a desired rate of change of engine and electric machine speed. The output is transferred to block 612.

Block 612 represents where a calculation is performed by the controller to determine the additional torque to rotate the engine and electric machine at a transmission input speed of the new gear. The calculation utilizes the inertia of the engine and electric machine along with desired rate of change of engine and electric machine speed. Block 612 outputs the additional torque amount to block 616.

Block 614 represents where a calculation is performed by the controller to determine the actual rate of change of engine and electric machine speed. The calculation utilizes the engine and transmission speed and time. Block 614 outputs the actual change in engine and electric machine speed to block 616.

Block 616 represents a function fn and a calculation that applies the function to determine a limited additional amount of torque that is applied to accelerate the engine and electric machine. The additional torque determined at block 612 is included in the calculation along with the present rate of change of engine and electric machine speed. Block 616 outputs a limited additional torque value to block 618.

Block 618 represents function fn_mot_portion and a calculation determines an additional amount of electric machine torque from the additional amount of torque determined at 616. The values in the function fn_mot_portion may be determined via operating a vehicle on a chassis dynamometer and performing manual transmission gear shifts while adjusting electric machine torque to achieve the desired engine and electric machine acceleration. The electric machine additional torque amount is output to block 622 and summing junction 640.

Block 630 represents function fnMTq_base that outputs a base electric machine torque that is referenced by the requested wheel torque, SOC, final drive ratio, and torque ratio of the presently engaged transmission gear. Values in the function may be empirically determined via operating the vehicle on a chassis dynamometer and adjusting electric machine torque values to improve driveline efficiency and performance. The base electric machine torque amount is output to summing junction 640.

Block 632 represents function fnETq_base that outputs a base engine torque that is referenced by the requested wheel torque, final drive ratio, and torque ratio of the presently engaged transmission gear. Values in the function may be empirically determined via operating the vehicle on a chassis dynamometer and adjusting engine torque values to improve driveline efficiency and performance. The base engine torque amount is output to summing junction 650.

Block 622 represents where a calculation to determine an additional amount of engine torque applied during the transmission gear shift is performed. The calculation applies the additional amount of electric machine torque and the additional torque amount that is determined at block 616. Block 622 outputs a limited additional torque value to summing junction 650.

The output of block 618 and the output of block 630 are added at summing junction 640 to generate a total electric machine torque command that includes the additional electric machine torque and the base electric machine torque. Likewise, the output of block 622 and the output of block 632 are added at summing junction 650 to generate a total engine torque command that includes the additional engine torque and the base engine torque.

Although not shown in this example, the output of blocks 618 and 622 may be manipulated so that the additive torque values are reduced when the engine and electric machine speed approaches the transmission input shaft speed.

As will be appreciated by one of ordinary skill in the art, method described herein may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method for operating a vehicle, comprising:
via a controller, adjusting a rotational speed of an internal combustion engine and an electric machine via adjusting torques of the internal combustion engine and electric machine responsive to an inertia of the internal combustion engine and the electric machine and a desired rate of speed change of the internal combustion engine and the electric machine, where the rotational speed is adjusted when a manually operated clutch that selectively couples the internal combustion engine and the electric machine to a transmission input shaft is fully open.

2. The method of claim 1, further comprising adjusting the torques of the internal combustion engine and the electric machine responsive to a blend ratio, where the blend ratio is based on a desired rotational speed of a transmission input shaft.

3. The method of claim 2, where the desired rate of speed change is a function of a maximum internal combustion engine torque at a speed of the internal combustion engine when the manually operated clutch is disengaged.

4. The method of claim 1, where the desired rate of speed change is a function of an engaged gear before a manual gear shift and an engaged gear after the manual gear shift.

5. The method of claim 4, where the manual gear shift is not performed via a non-human actuator.

6. The method of claim 1, where the desired rate of speed change is a function of a maximum electric machine torque.

7. The method of claim 1, further comprising adjusting the torques of the engine and the electric machine responsive to a blend ratio, where the blend ratio is based on an actual rotational speed of the internal combustion engine and the electric machine.

8. The method of claim 1, where the torques of the internal combustion engine and the electric machine are adjusted during a manual gear shift after a gear selector engages a new gear while the manually operated clutch that selectively couples the internal combustion engine and the electric machine to the transmission input shaft is fully open.

* * * * *